(No Model.)
M. E. WELLER.
DEVICE FOR CONVERTING MOTION.
No. 268,846. Patented Dec. 12, 1882.
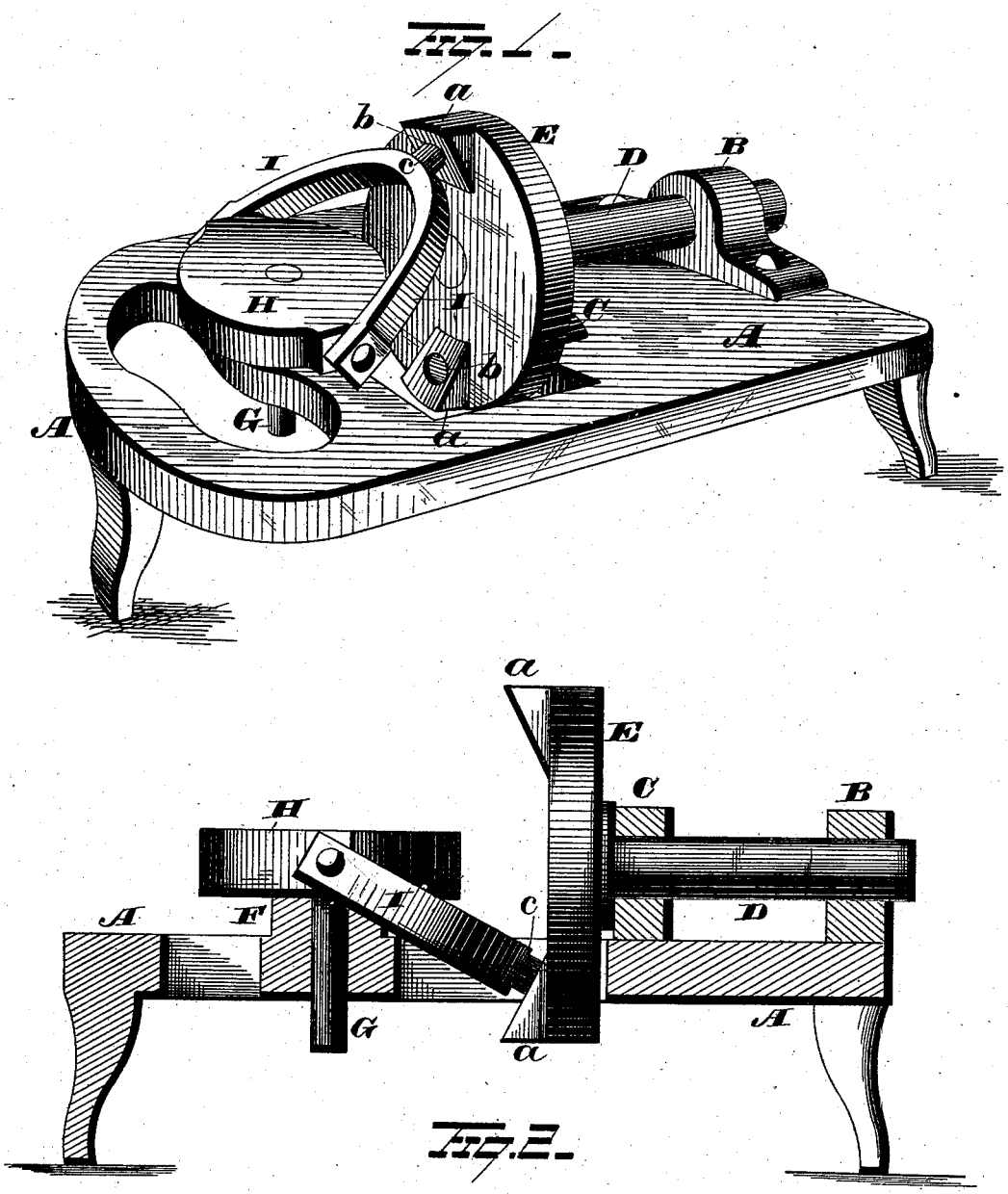
WITNESSES
S. G. Nottingham
George Cook.
INVENTOR
M E Weller.
B.F.A. Symons.
Attorney

UNITED STATES PATENT OFFICE.

MARVIN E. WELLER, OF FORT PLAIN, NEW YORK.

DEVICE FOR CONVERTING MOTION.

SPECIFICATION forming part of Letters Patent No. 268,846, dated December 12, 1882.

Application filed October 27, 1882. (No model.)

*To all whom it may concern:*

Be it known that I, MARVIN E. WELLER, of Fort Plain, in the county of Montgomery and State of New York, have invented certain new and useful Improvements in Devices for Converting Motion; and I do hereby declare the following to be a full, clear, and exact description of the invention, such as will enable others skilled in the art to which it pertains to make and use the same.

My invention relates to an improved device for converting motion, the same consisting in certain novel features of construction and combinations of parts, as will be hereinafter fully described, and pointed out in the claims.

In the accompanying drawings, Figure 1 is a view in perspective of my improved device, and Fig. 2 is a longitudinal sectional view with the positions of the parts changed.

A represents the base or frame, upon which is secured the bearings B C for the purpose of supporting the horizontal rotary shaft D. On one end of this shaft is mounted a wheel, E, provided with one or more bearings, $a\ a$, said bearings being provided with diagonal or slanting holes or perforations $b\ b$. The frame A is also provided with the vertical bearing F, which is adapted to receive the vertical shaft G. The upper end of this vertical shaft G is provided with a reciprocating disk or wheel, H, to which is loosely secured a bifurcated yoke, I, half encircling the said disk or wheel H. To the outer side and midway of the yoke I is secured or made integral therewith an arm or projection, $c$, which is adapted to fit in the slanting perforations $b\ b$ in the bearings $a\ a$.

When rotary motion is applied to the shaft D it imparts its motion to the wheel E, which in turn imparts a revolving motion to the inner end of the yoke I and a double reciprocatory motion to the two outer ends thereof. As the two ends of the said yoke are loosely secured to the two opposite points in the periphery of the wheel H, a reciprocating motion is transmitted from the yoke I to the disk or wheel H. Thus when a rotary motion is imparted to the horizontal shaft D when the parts are in the positions as shown in Fig. 1, a quarter of a revolution of the wheel E to the left will turn the wheel H to a certain distance to the right, and on turning the wheel E to the left a half-revolution the wheel H is returned to its original position, as shown in Fig. 2, the arm $c$ of the yoke I being at the lowest point in its revolution. On continuing the revolving motion of the shaft D another quarter-turn the wheel H is turned a certain distance to the left, after which it returns to its original position once more, as shown in Fig. 1.

It will now be readily perceived that through the agency of my improved device a rotary motion is converted into a reciprocating motion.

Having fully described my invention, what I claim as new, and desire to secure by Letters Patent, is—

1. In a machine for converting a rotary into a reciprocating motion, the combination, with a horizontal rotary shaft supported in suitable bearings, and provided on its inner end with a wheel having one or more bearings formed on its inner face, of a vertical shaft supported in suitable bearings, and provided on its upper end with a disk or wheel, and a bifurcated yoke connecting the said wheel on the horizontal shaft to the disk or wheel on the vertical shaft, and adapted to convert the rotary motion of the horizontal shaft to a reciprocating motion of the vertical shaft.

2. In a machine for converting a rotary into a reciprocating motion, the combination, with the frame A, provided with suitable bearings, B C, in which is mounted a horizontal rotary shaft, D, said shaft being provided on its inner end with a wheel, E, having two bearings, $a\ a$, provided with slanting perforations $b\ b$, of a vertical shaft, G, mounted in a vertical bearing, F, and provided on its upper end with a reciprocating wheel, H, and a yoke, I, loosely secured at two opposite points in the periphery of said disk or wheel H, and having an arm or projection, $c$, fitting into a slanting perforation, $b$, in one of the bearings $a$ of the wheel E, all of the above parts being adapted to operate substantially in the manner described, and for the purpose set forth.

In testimony whereof I have signed this specification in the presence of two subscribing witnesses.

MARVIN E. WELLER.

Witnesses:
J. S. YOST,
L. M. WELLER.